United States Patent

Inuzuka

[11] Patent Number: 5,995,571
[45] Date of Patent: Nov. 30, 1999

[54] SYNCHRONIZING APPARATUS FOR SPREAD SPECTRUM COMMUNICATIONS

[75] Inventor: Hiroyuki Inuzuka, Kariya, Japan

[73] Assignee: Kabushiki Kaisha Toyoda Jidoshokki Seisakusho, Aichi-ken, Japan

[21] Appl. No.: 08/832,631

[22] Filed: Apr. 4, 1997

[30] Foreign Application Priority Data

Apr. 8, 1996 [JP] Japan .................................. 8-085246

[51] Int. Cl.⁶ ............................................. H04L 7/06
[52] U.S. Cl. ........................... 375/367; 375/208; 375/367
[58] Field of Search ................................... 375/208, 343, 375/367, 355

[56] References Cited

U.S. PATENT DOCUMENTS

| | | | |
|---|---|---|---|
| 4,651,327 | 3/1987 | Fujita | 375/1 |
| 4,943,975 | 7/1990 | Kurihara et al. | 375/1 |
| 4,968,981 | 11/1990 | Sekine et al. | 342/356 |
| 5,090,023 | 2/1992 | Watanabe et al. | 375/208 |
| 5,579,321 | 11/1996 | Van Grinsven et al. | 375/368 |
| 5,832,021 | 11/1998 | Kondo | 375/208 |

FOREIGN PATENT DOCUMENTS 2228142  9/1990  Japan .
750612  2/1995  Japan .

*Primary Examiner*—Tesfaldet Bocure
*Attorney, Agent, or Firm*—Morgan & Finnegan, L.L.P.

[57] ABSTRACT

An input data obtained by differential-decoding a signal transmitted from a transmitting equipment is input to a DMF. The DMF obtains a correlation value, and outputs the correlation value and data value to a maximum value detection unit. The maximum value detection unit extracts the maximum value from the correlation values output at the sampling timing, and outputs the position of the maximum correlation value (synchronous point signal) and the data value corresponding to the maximum correlation value. The synchronous point comparison unit monitors a synchronous point signal, detects whether or not a synchronous point deviates, and resets a counter based on the deviation of the synchronous point. A counter reset determination unit also monitors the synchronous point signal, and resets the counter so that the apparent position of the synchronous point can be around the center of the window when the counter value indicating the synchronous point is not in a predetermined range.

11 Claims, 14 Drawing Sheets

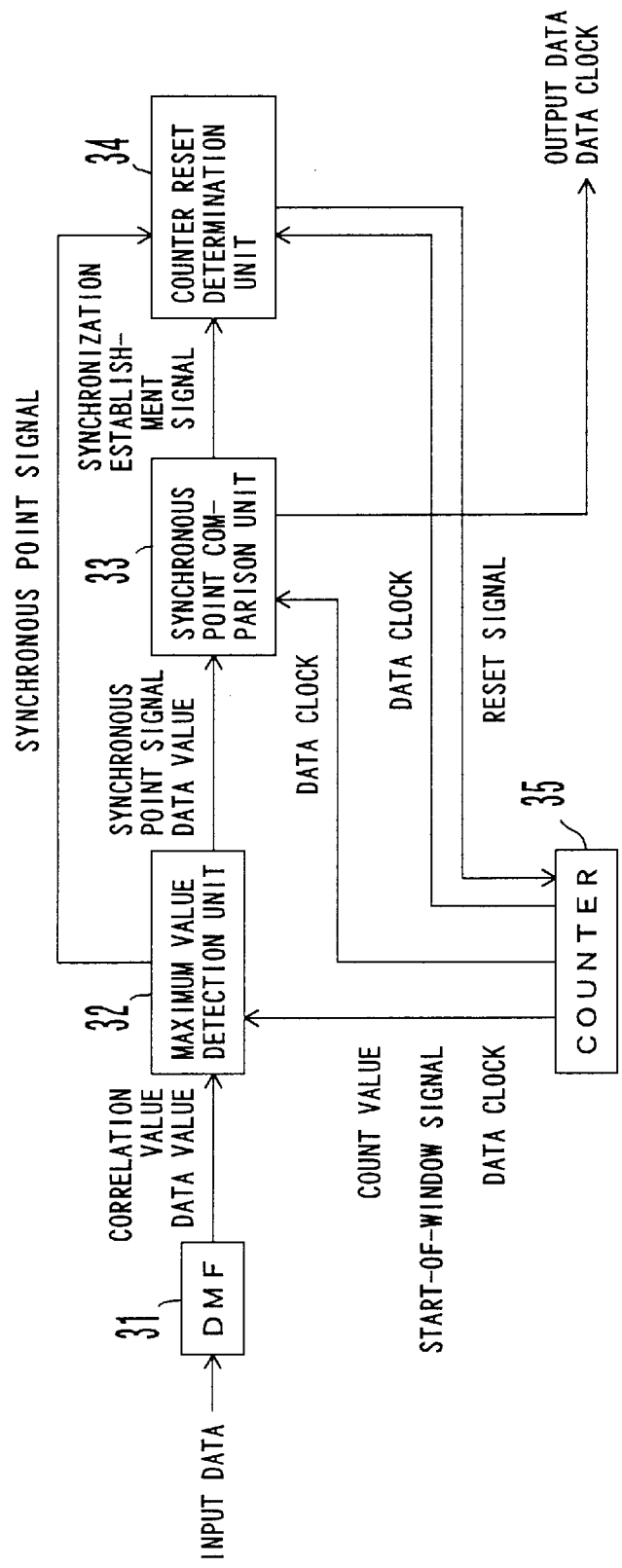
F I G. 7

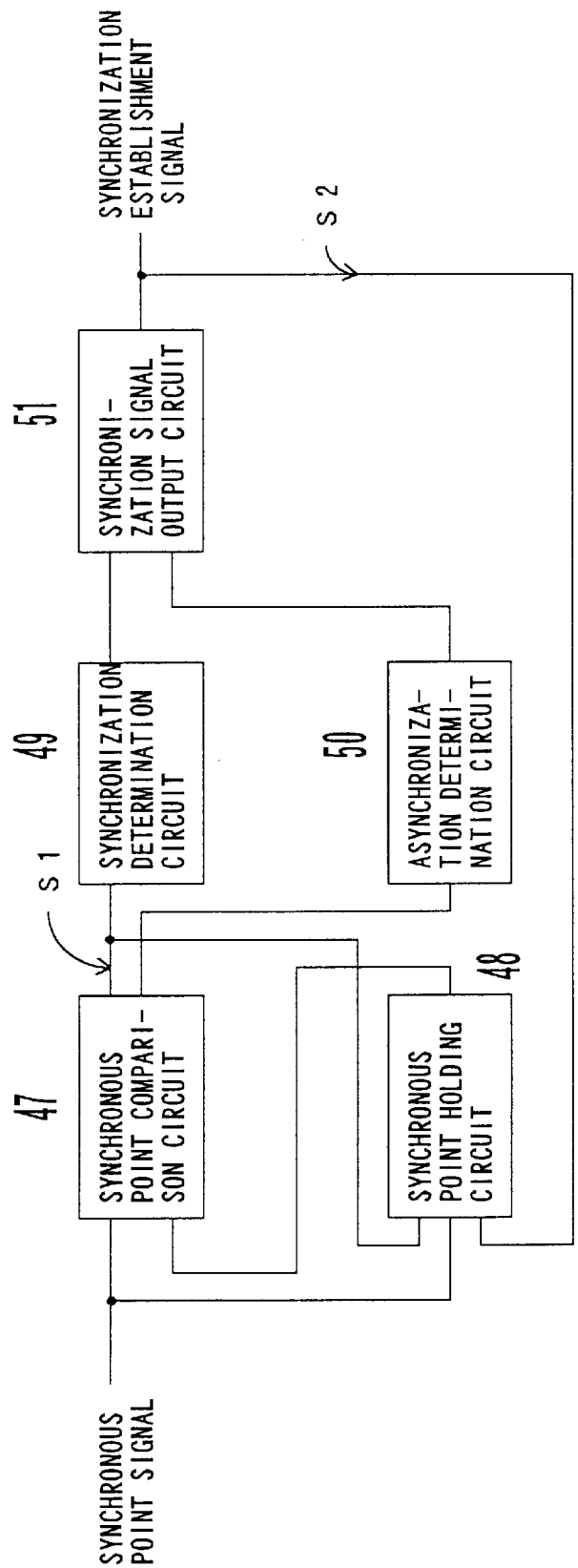
F I G. 9

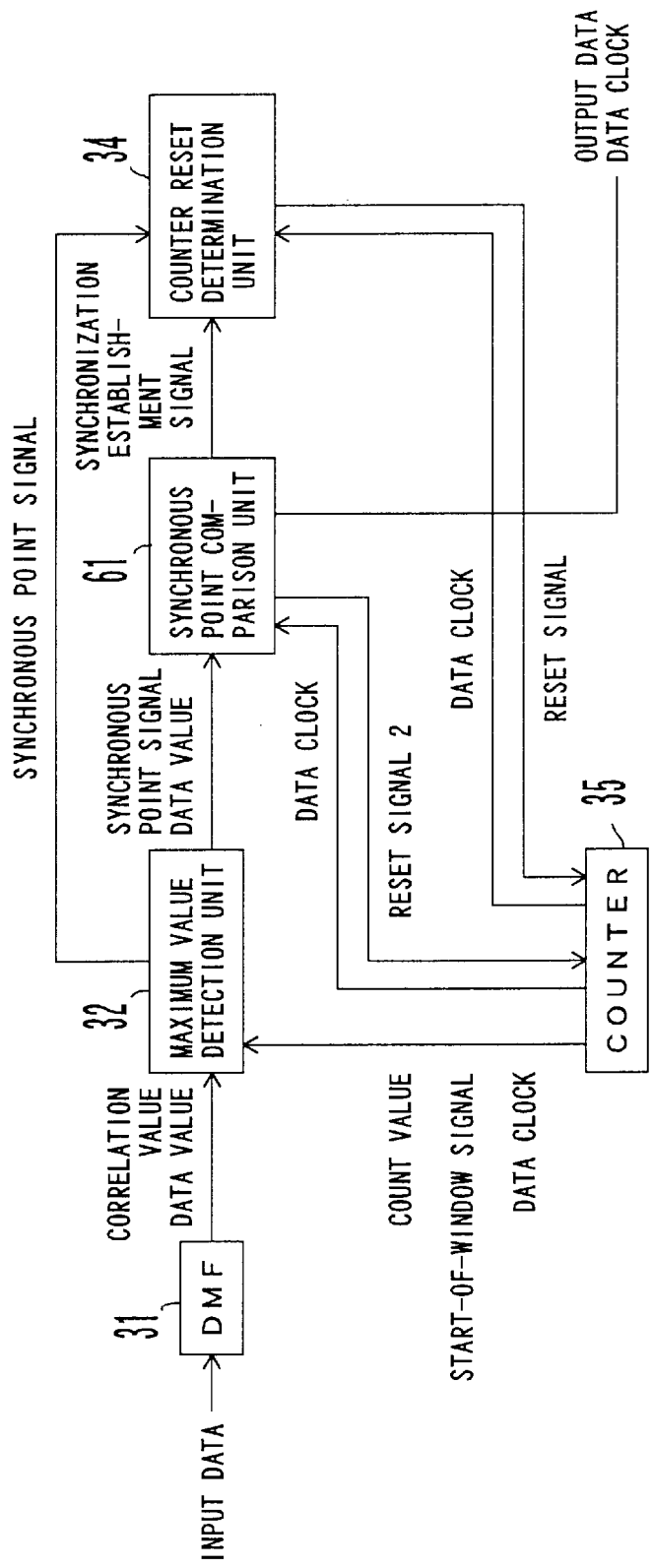
F I G. 1 2

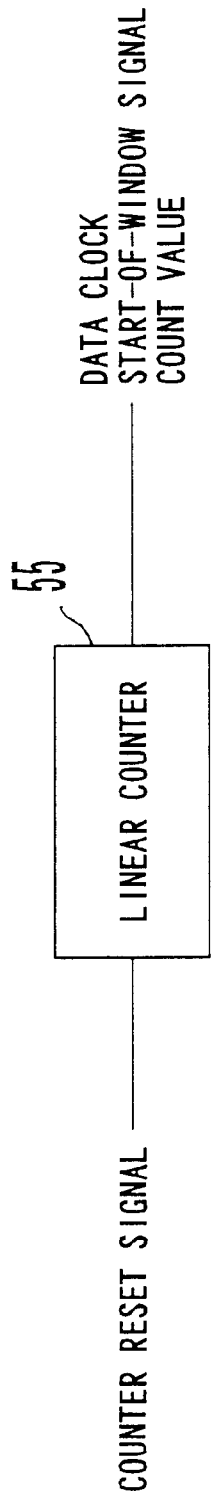
F I G. 14A
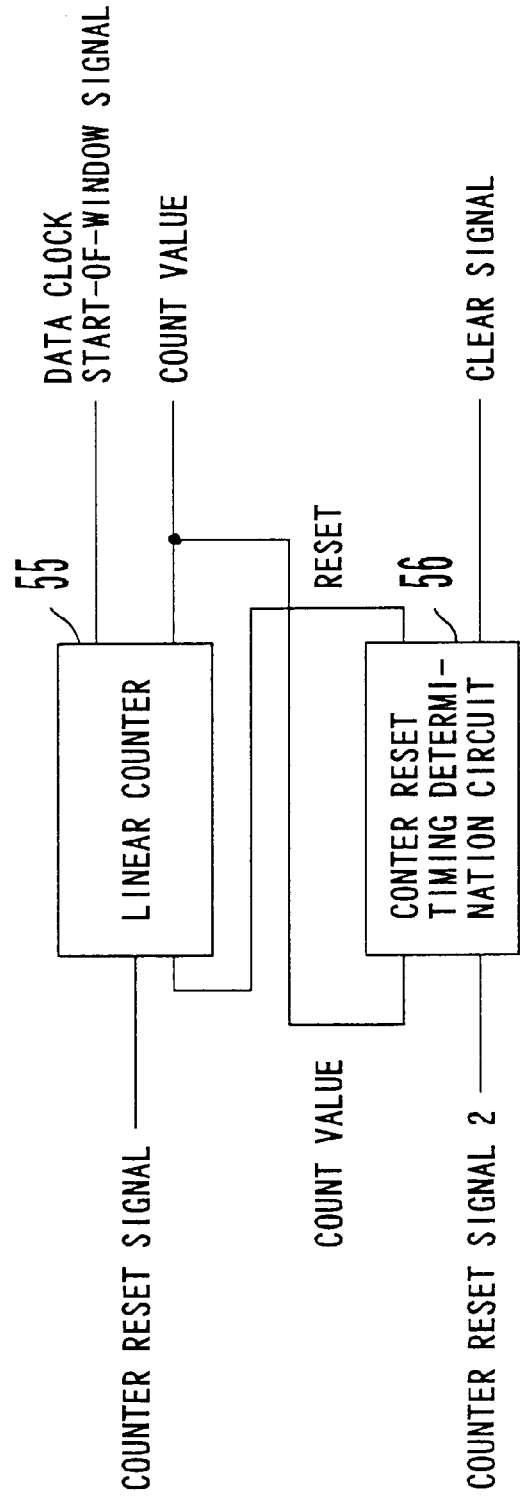
F I G. 14B

SYNCHRONIZING APPARATUS FOR SPREAD SPECTRUM COMMUNICATIONS

BACKGROUND OF THE INVENTION

1. Field of the Invention

The present invention relates to a synchronization device in a receiving device operated in a spread spectrum communications system.

2. Description of the Related Art

Recently, wireless communications such as portable telephone, etc. are widely used, and therefore it is important to effectively use the frequency channels so that a large number of subscribers can use their portable telephones. To solve this problem, a frequency division multiplexing system limits a band to be assigned to one frequency channel to accommodate the largest possible number of frequency channels in one frequency band.

It is also effective to limit the time of occupying one frequency channel by one subscriber to assign a channel to each subscriber after dividing communications time. It is a time division multiplexing system.

Another effective system is a spread spectrum system. For example, it is realized by superimposing a predetermined signal having a frequency band much larger than a base band signal on a phase-shift-keying modulated base band signal to spread the frequency band of a signal and send it as an electric wave.

This spread spectrum communications system can be a direct sequence (DS) system, a frequency hopping system, a time hopping system, etc. depending on the spreading method. Described below is the DS system.

In the DS system, a pseudo noise (PN) code is used as a predetermined signal to spread the frequency band. The PN code refers to binary data transmitted much faster than normal transmission data. The frequency band of the transmission data spread by the PN code is much broader than that of the original transmission data.

In the receiving equipment, a reverse-spreading process is performed by multiplying the data signal spread-spectrum-modulated in the transmitting equipment by the PN code used by the transmitting equipment so that the original transmission data can be retrieved. At this time, the phase of the PN code by which the received data is multiplied should be the same as that of the PN code used by the transmitting equipment. Therefore, a synchronizing process is performed for phasing.

FIG. 1 shows the configuration of a part of the conventional spread spectrum communications system.

A multiplier 111 multiplies the data transferred on the carrier from the transmitting equipment by an output signal from a crystal oscillator 112. The frequency of the carrier can be, for example, 2.4GHz. The crystal oscillator 112 outputs a periodic wave having the same frequency as the above described periodic wave, that is, 2.4GHz. A low-pass filter 113 passes only a signal around the base band, and filters the output signal from the multiplier 111. A limiter 114 monitors the output value from the low-pass filter 113 in one-chip units of PN codes, and binarizes (represents by digits) through the collation between the output value and a predetermined limit value. That is, the limiter 114 performs the 1-bit A/D converting process.

A PN code generation circuit 117 provides a correlation unit 118 with a PN code having the same pattern as the PN code multiplied in the transmitting device. The correlation unit 118 has a matched filter, and detects the phase-synchronization of a PN code in the transmitting and receiving devices at the timing of a peak value (detection of correlation) of the output when the output signals from the multiplier 111 are sequentially input. Then, it outputs data being regenerated by multiplying the signal output from the multiplier 111 at the timing by the PN code as reproduced data.

In the spread spectrum communications system, a reverse-spreading process should be performed by multiplying a PN code in the receiving device in synchronism with the PN code multiplied in the transmitting device.

FIGS. 2A through 2C show examples showing the conventional configuration for maintaining synchronization.

In the configuration shown in FIG. 2A, a maximum value detector 122 monitors the correlation value output from a correlation unit 121, and stores the timing at which the maximum value of the correlation value is detected. The information about the timing at which the maximum value has been detected is transmitted to a synchronous point comparator 123, and it is determined whether or not the timing (synchronous point) at which the maximum correlation value is obtained is shifting. When the synchronous point shifts, it indicates that the timing of the sampling clock used in the transmitting device is asynchronous with the timing of the sampling clock used in the receiving device. Therefore, the timing should be amended to correctly receive data in the receiving equipment. Using the synchronous point comparison information (a signal indicating how the timings of the maximum correlation values deviate from each other), the voltage, etc. applied to an oscillator 124 is controlled to adjust the output timing or the phase of a sampling clock. Thus, the timing at which the maximum correlation value is obtained is not deviated to stably receive the data.

With the configuration shown in FIG. 2B, the correlation unit 121 outputs a correlation value. The maximum value detector 122 detects a timing at which the maximum value detector 122 detects the maximum correlation value. The synchronous point comparator 123 outputs a control signal to control the oscillator 124 according to the synchronous point comparison information indicating whether or not the timing has deviated. A PN code generator 125 outputs a PN code to the correlation unit 121 based on the signal of a frequency oscillated by the oscillator 124, adjusts the timing (position of a synchronous point) at which the maximum correlation value can be obtained, and thus performs a control process to stabilize the position of a synchronous point. Since the PN-code multiplication can be performed in synchronism with the signal transmitted from the transmitting equipment, a correct signal can be received.

With the configuration shown in FIG. 2C, as in the above described configuration, the correlation unit 121 outputs a correlation value. The maximum value detector 122 detects the position of a synchronous point at which the maximum correlation value can be obtained. The synchronous point comparator 123 detects the deviation of the position of a synchronous point. With the configuration shown in FIG. 2C, the output from an oscillator 127 is not used as is in the correlation unit 121, but is input to a divider 126, and then input to the correlation unit 121 after controlling the phase of the sampling clock.

Thus, in the spread spectrum communications system, a correct signal should be received with synchronism by generating a sampling clock in the receiving equipment in a way that the sampling clock agrees in phase and synchronism with the sampling clock at which the transmitting equipment performs a PN-code multiplication.

FIG. 3 shows an example of the configuration of the digital matched filter which is a correlation unit. In this example, 128 chips are assigned to 1-bit transfer data, and a double-oversampling system is used to enhance the precision in detecting correlation.

Flipflops 131-1 through 131-128 can be, for example, a flipflop group for storing PN codes generated by the PN code generation circuit 125. The Q output of the flipflop 131-i is applied to the D terminal of the flipflop 131-i+1. The PN code applied to the D terminal of the flipflop 131-1 is sequentially shifted step by step using the sampling clock. The clock stops when a 128-chip PN code is stored, and the value is stored.

Flipflops 132-1a, 132-1b, ..., 132-128a, and 132-128b are a flipflop group for storing input data. The Q output of each flipflop is applied to the D terminal of the next flipflop. The input data applied to the D terminal of the flipflop 132-1a is shifted step by step by the sampling clock. The frequency of the sampling clock is double the frequency of the PN code (clock frequency of a chip) so that a double-oversampling process can be performed.

An adder 134 adds up the logical values output from the exclusive NOR circuits 133-1a, 133-1b, 133-128a, and 133-128b. That is, the number of exclusive NOR circuits which outputs 1 is obtained.

The sum1 computed by the adder 134 is input to a subtractor 135, a comparator 136, and a selector 137.

The subtractor 135 computes sum2=256-sum1 and outputs sum2 to comparator 136 and selector 137.

The comparator 136 compares sum1 with sum2. If sum1 >sum2, then 1 is output. If sum1 ≦sum2, then 0 is output. The selector 137 outputs sum1 when the output value from the comparator 136 is 1, and outputs sum2 when the output value from the comparator 136 is 0.

In the receiving equipment, there is a data clock for generating a timing at which output data can be obtained in addition to the sampling clock for use in multiplying a reception signal by the PN code. The output data is formed in a way that one bit is output on one cycle of data clock. This bit outputs data corresponding to the largest correlation value in all values obtained in the correlation unit on one cycle of the data clock. However, a correlation value can be variable for each timing of a sampling clock, and data can be generated corresponding to the maximum correlation value on one cycle of the data clock even without synchronization. Therefore, wrong data may be inserted or correct data may be lost unless only one correlation value indicating the correct synchronization appears on one cycle (window) of the data clock.

FIGS. 4A through 4C show the problems with the case where clocks are not in synchronism with each other between the transmission equipment and the receiving equipment.

In each of FIGS. 4A through 4C, the correlation value is indicated on top among the three values at each timing. Each of the peaks indicates a synchronous point. Indicated below each correlation value is a data clock, and one cycle of the data clock is hereinafter referred to as a window. Indicated at the bottom among the three values is a counter value in synchronism with the sampling clock.

As shown in FIG. 4A, data can be correctly regenerated when one synchronous point exists in one window. That is, a data value corresponding to the maximum correlation value detected by the maximum value detector is stored in one window. At the right end of the window (at the end of one cycle of the data clock), the data value corresponding to the stored maximum correlation value is output.

FIG. 4B shows the case where two synchronous points exist in one window. Since only one data value can be output in one window, one data value is regenerated although two data values should be regenerated corresponding to the two synchronous points in the above described window. As a result, one data value to be regenerated cannot be successfully output.

FIG. 4C also shows the case where no synchronous points exist in one window. In FIGS. 4A through 4C, the correlation values are similarly small at points other than the synchronous points. However, an actual correlation value can be any value at points other than a synchronous point. In FIGS. 4A through 4C, the correlation values indicate concave and convex figures (like ripples) between synchronous points. Therefore, if there are no synchronous points in one window in FIG. 4C, then a data value is regenerated at a timing corresponding to the largest correlation value in the correlation values forming ripples. However, since there are actually no synchronous points in this window, a wrong data value is regenerated.

If the clock indicates such a deviation, a synchronous point deviates in a window. If this occurs in series, the synchronous point deviates to the end of the window. When the synchronous point further deviates, it goes beyond the end of the window and enters the next window. In such a case, a problem of wrong data occurs (an excess piece of data is inserted or a piece of necessary data is lost).

Therefore, if a correct data value should be regenerated, one synchronous point is required to exist in one window. As described by referring to FIGS. 2A through C, an oscillator is operated to change the phase of the sampling clock to set one synchronous point in one window according to the conventional technology.

However, according to the conventional configuration, the clock must be controlled at a precision level equal to or higher than the PN code chip rate level or the sampling clock level, thereby requiring a difficult circuit configuration. Furthermore, a large-scale circuit is required and the entire system becomes costly.

SUMMARY OF THE INVENTION

Therefore, the present invention aims at providing a synchronizing apparatus having a simple hardware configuration capable of compensating and maintaining the synchronization by controlling, in receiving equipment of the spread spectrum communications system, a data clock at a data rate level without controlling a sampling clock.

According to the present invention, a synchronizing apparatus in a receiving device operated in the spread spectrum communications system includes a counter for generating a timing signal for use in a multiplication by a spread code, a counter value synchronous with the timing signal, and a data clock indicating the timing at which a data value is obtained; a maximum value detection unit for detecting the maximum correlation value output by a correlation unit which performs a reverse-spreading process, and detecting a synchronous point based on the counter value corresponding to the maximum correlation value; a synchronous point comparison unit for determining whether or not the counter value indicating the synchronous point obtained from the maximum value detection unit indicates the deviation of the synchronous point, and outputting a signal indicating whether or not synchronization has been achieved; a counter reset determination unit for receiving the signal indicating whether or not synchronization has been achieved, transmitting a reset signal to the counter when the synchronous point has deviated, and resetting the counter.

The present invention can be designed for another configuration, and includes a counter for generating a timing signal for use in a multiplication by a spread code, a counter value synchronous with the timing signal, and a data clock indicating the timing at which a data value is obtained; a maximum value detection unit for detecting the maximum correlation value output by a correlation unit which performs a reverse-spreading process, and detecting a synchronous point based on the counter value corresponding to the maximum correlation value; a synchronous point comparison unit for determining whether or not the counter value indicating the synchronous point obtained from the maximum value detection unit indicates that the synchronous point is in a predetermined range, and outputting a signal indicating whether or not synchronization has been achieved; a counter reset determination unit for receiving the signal indicating whether or not synchronization has been achieved, transmitting a reset signal to the counter when the synchronous point is not in the predetermined range, and resetting the counter.

The maximum value detection unit monitors the correlation value transmitted from the correlation unit, and detects the maximum correlation value for each cycle of a data clock. The correlation value indicates the maximum value when the timing at which the transmitting equipment performs a multiplication by a spread code is synchronous with the timing at which the receiving equipment performs a multiplication by a spread code and performs a reverse-spreading process. When one synchronous point exists on one cycle of the data clock, data can be correctly regenerated. However, since the clocks in the transmitting equipment and the receiving equipment are individually generated, they are necessarily asynchronous with each other. As a result, no synchronous points may exist or two or more synchronous points exist in one window. In such cases, wrong data is regenerated. Therefore, it is necessary to control the system such that one synchronous point may exist on one cycle (window). When a synchronous point deviates to an end of the window, or when no synchronous points exist in a predetermined range, the counter is reset at an appropriate timing. Thus, the data clock is also reset and output at a timing different from the timing before resetting the data clock. As a result, the position of the synchronous point relatively deviates to the window of the data clock, and the synchronous point deviates to around the center of the window.

If the synchronous point exists around the center of the window, then the synchronous point does not immediately go beyond the window even if the clocks are asynchronous with each other. Therefore, packet-formatted data can be correctly regenerated.

According to another embodiment of the present invention, a synchronous point comparison unit is designed to output a counter reset signal upon detection of a synchronous point, thereby correctly regenerating non-packet-formatted-sequential data.

BRIEF DESCRIPTION OF THE DRAWINGS

FIG. 7 is a block diagram showing the first embodiment of the demodulation circuit according to the present invention;

FIG. 9 is a block diagram showing a part of the synchronous point comparison unit;

FIG. 12 is a block diagram showing the configuration according to the second embodiment of the demodulation circuit in the receiver according to the present invention;

FIGS. 14A and 14B are block diagrams showing the configuration of the counter.

DESCRIPTION OF THE PREFERRED EMBODIMENTS

Figure 1:
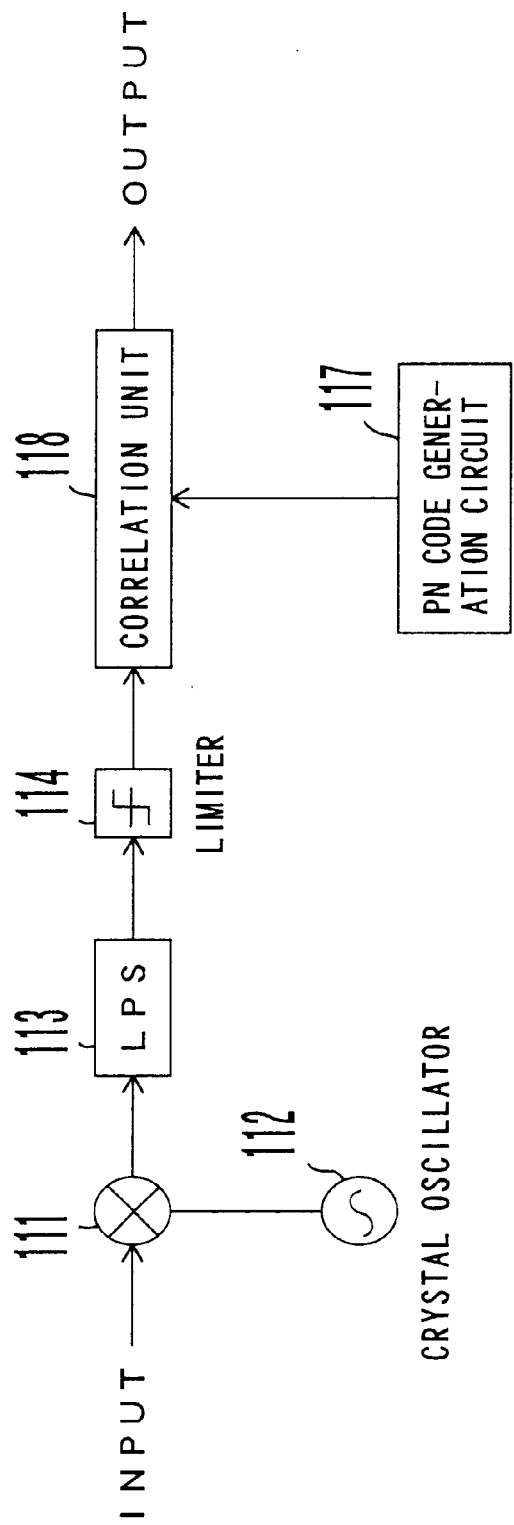
FIG. 1 shows the configuration of a part of the conventional spread spectrum communications system.
Figure 2A:
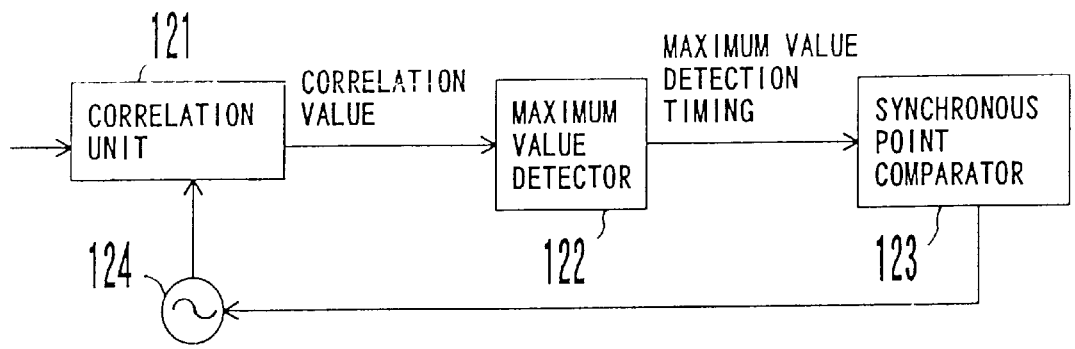
FIGS. 2A through 2C show an example of the conventional configuration for maintaining synchronization.
Figure 2B:
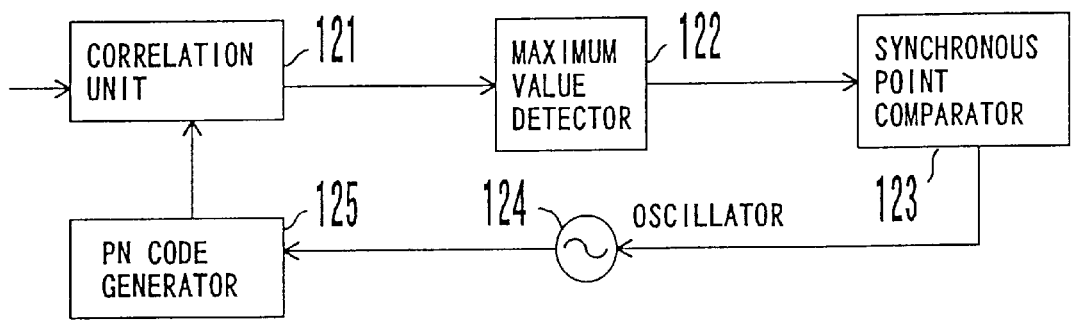
Figure 2C:
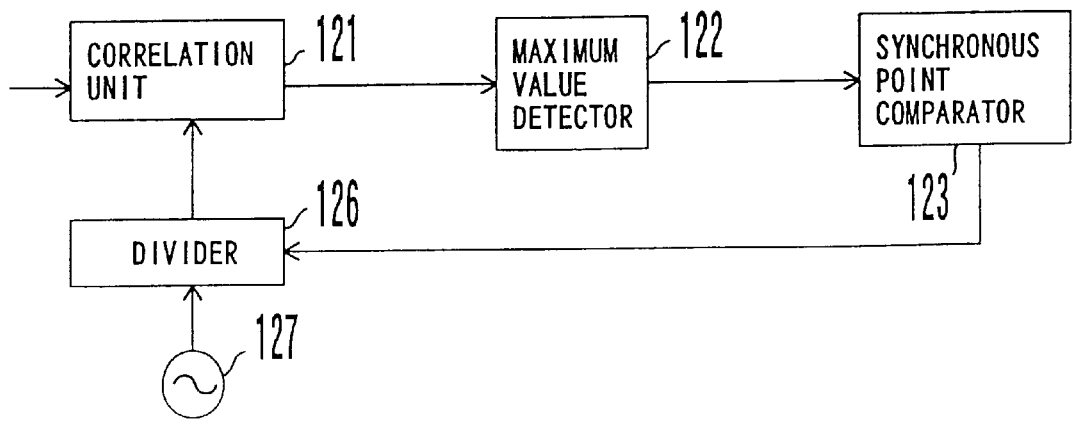
Figure 3:
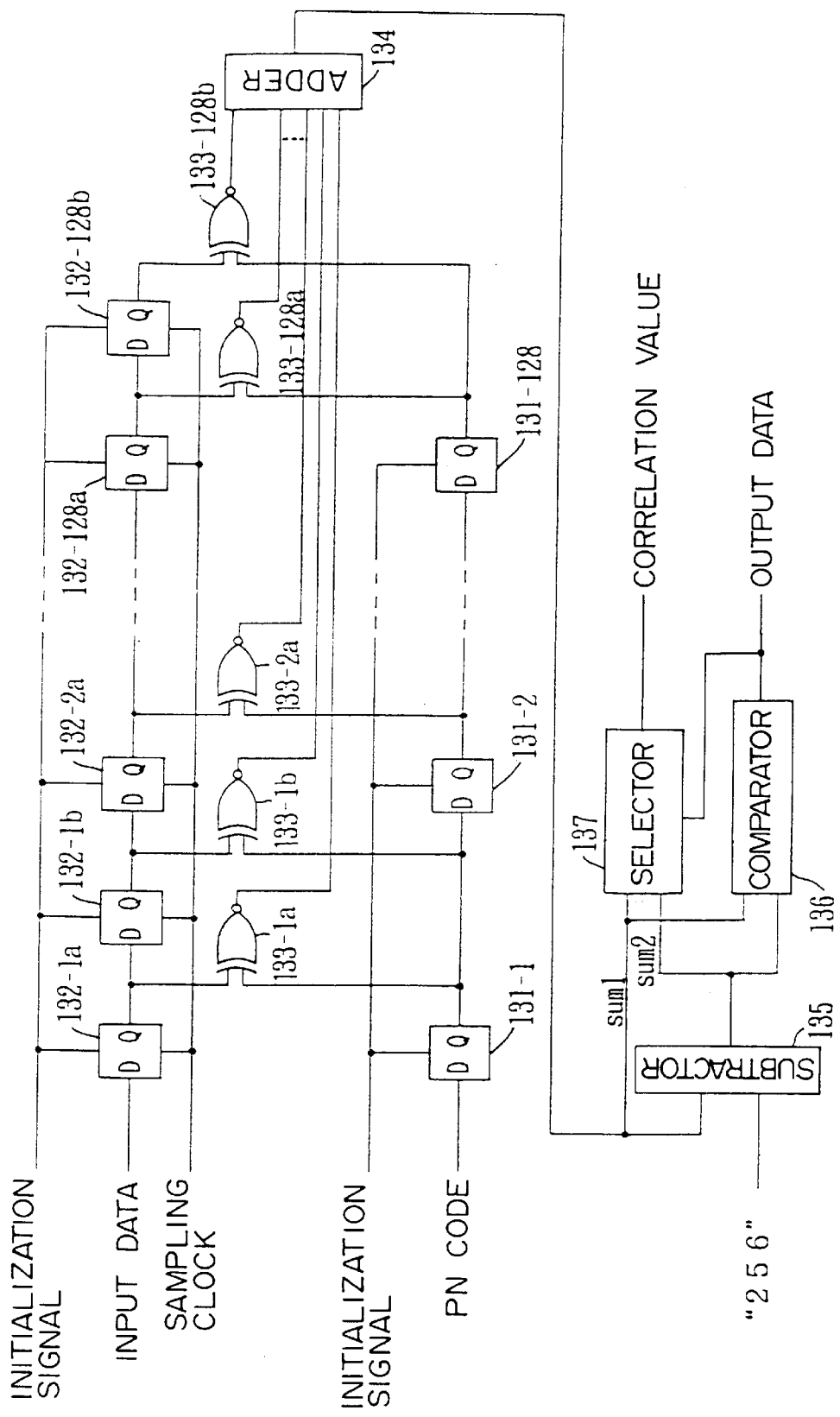
FIG. 3 shows an example of the configuration of a digital matched filter, that is, a correlation unit.
Figure 4A:
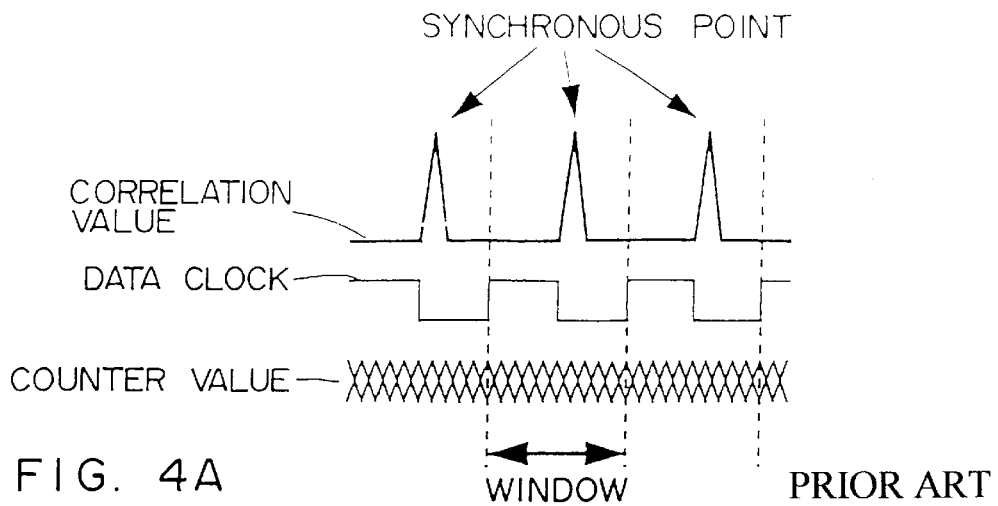
FIG. 4A through 4C show the problem with the case where the clocks are asynchronous with each other between the transmitting equipment and the receiving equipment.
Figure 4B:
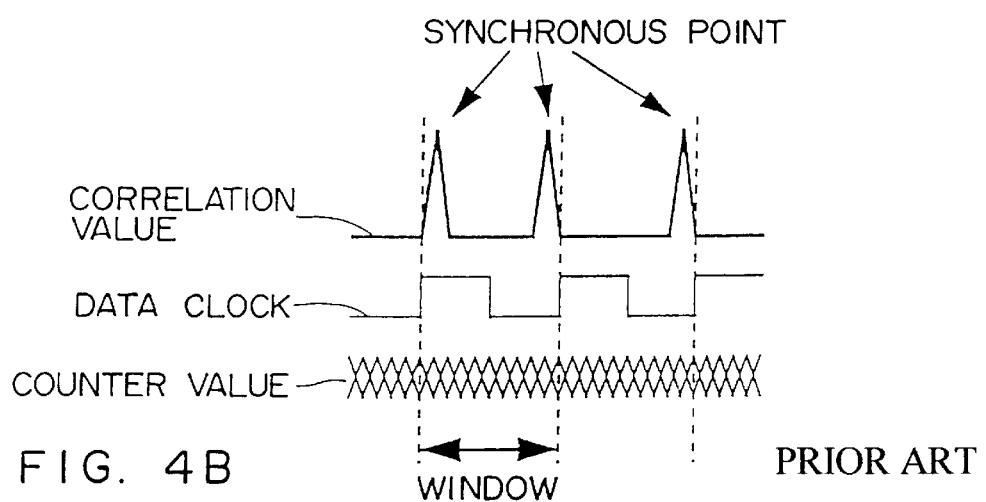
Figure 4C:
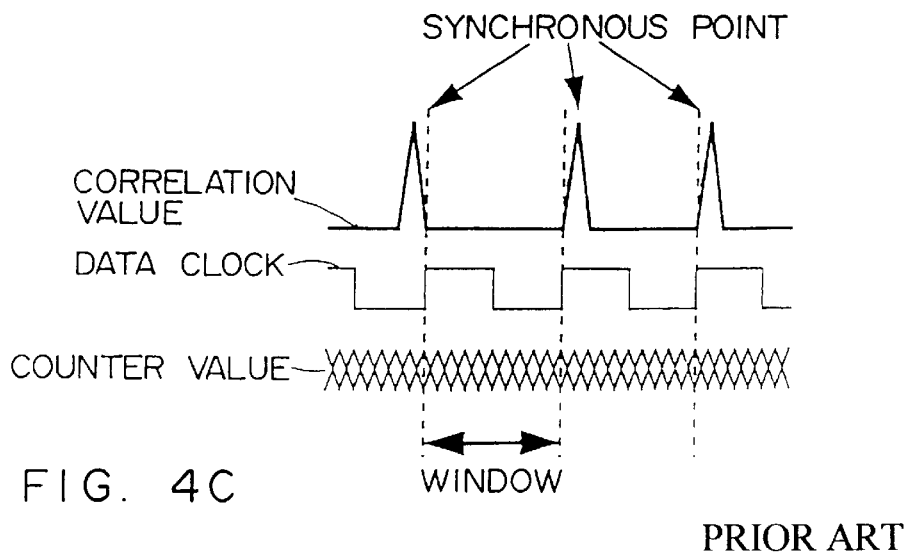
Figures 5A, 5B:
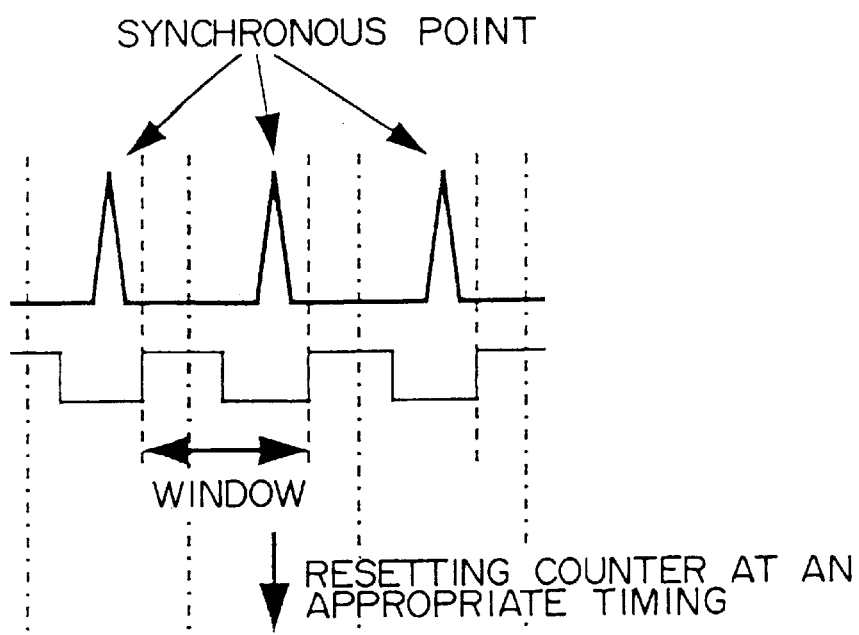
FIGS. 5A and 5B show the principle of the present invention.

FIGS. 5A and 5B show the principle of the present invention.

In FIG. 5A, the synchronous point is detected at the end of the window. If the deviation of the data clock is left as is before regenerating data, the synchronous point gradually deviates and finally enters the adjacent window before receiving data, thereby causing data error. In the present invention, the position of the synchronous point is monitored, and the counter is reset and a data clock is generated at a new timing if the synchronous point is located at the end of the window (that is, the counter value indicating the position of the synchronous point is in a predetermined range). Thus, the position of the window (the timing at which a data clock is generated) is changed as shown in FIG. 5B, and the synchronous point can deviate to around the center of the window. The timing of resetting the counter can be, for example, the point when the data clock is switched from the high level to the low level. By thus moving the synchronous point to the center of the window, the synchronous point does not immediately enter the adjacent window even if the clock deviates. As a result, a data value can be correctly regenerated for the time being. In such a case, serial data values cannot be successfully regenerated, but satisfactory data values can be regenerated when the length of the data is appropriately limited as in the packet communications.

To regenerate serial data signals, the position of the synchronous point in the window can be constantly monitored, and the counter can be reset each time the position of the synchronous point deviates by one chip (one clock of the sampling clock).

Figure 6A:
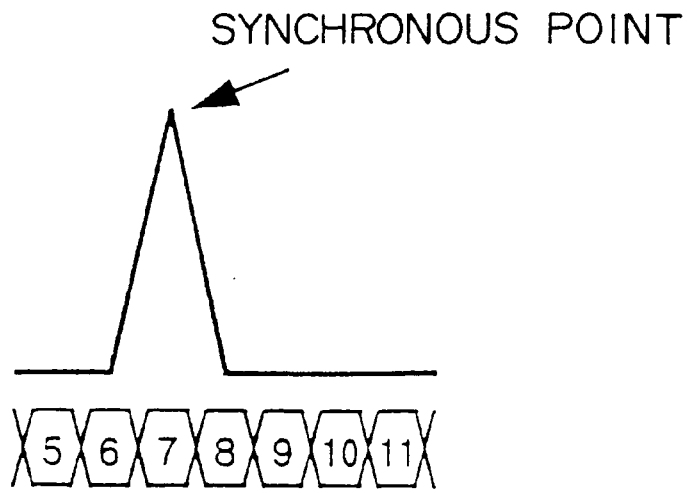
FIGS. 6A through 6C generally show the relationship between the deviation of a synchronous point and the counter to be reset.
Figure 6B:
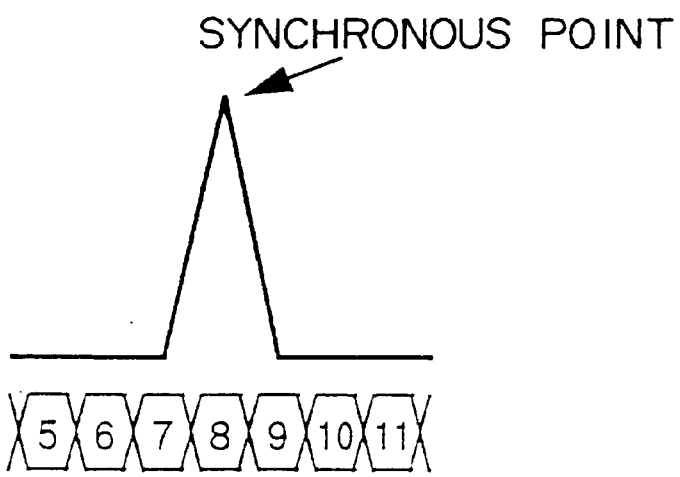
Figure 6C:
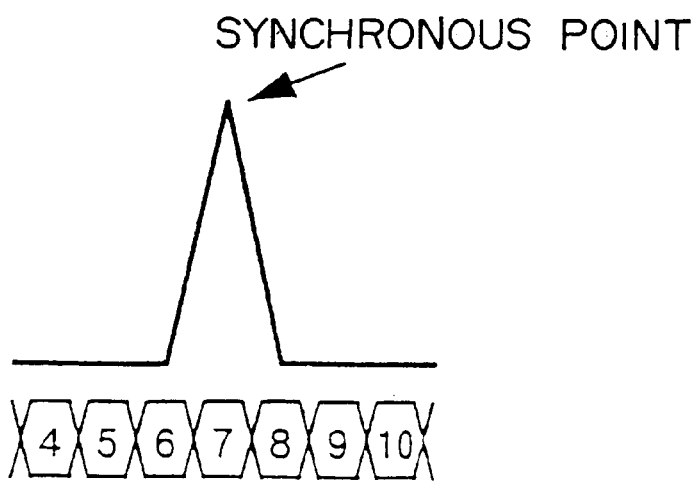

FIGS. 6A through 6C show the relationship between the deviation of the synchronous point and the counter to be reset.

Assuming that the synchronous point is detected at position 7 indicated by the counter value as shown in FIG. 6A, and that the clocks of the transmitting and receiving equipments are asynchronous with each other, the position of the synchronous point deviates to position 8 indicated by the counter value as shown in FIG. 6B. If the deviation is monitored and reset the counter at an appropriate timing, the synchronous point can be set at position 7 again as indicated by the counter value. Thus, the position of the synchronous point can be relatively adjusted by resetting the counter. Since the data clock can be generated in synchronism with the counter value, the position of the synchronous point can be relatively adjusted in a window. Thus, serial data can be correctly regenerated by constantly monitoring the deviation of the position of the synchronous point and resetting the counter each time the deviation is detected.

FIG. 7 is a block diagram showing the first embodiment of the demodulation circuit according to the present invention.

A DMF 31 is a digital matched filter, obtains the correlation between the input data transmitted from the transmitting equipment and the PN code, and outputs a correlation value and a data value. The DMF 31 operates with the sampling clock, and outputs the correlation value and the data value when the input data is input to the DMF 31 at the timing of the sampling clock.

A maximum value detection unit 32 receives the correlation value and the data value from the DMF 31, detects the maximum correlation value in the signals transmitted at the sampling rate, and outputs the data value corresponding to the maximum correlation value. A count value, a start-of-window signal, and a data clock are input from a counter 35 to the maximum value detection unit 32. The maximum value detection unit 32 detects the position of the maximum correlation value in the window using the count value and the start-of-window signal provided by the counter 35, and outputs the result as a synchronous point signal to a synchronous point comparison unit 33 in synchronization with the data clock. That is, the data clock provided by the counter 35 is used by the maximum value detection unit 32 to generate a data value in one window.

The synchronous point comparison unit 33 determines whether or not the synchronous point has deviated in the window using the synchronous point signal and the data value transmitted from the maximum value detection unit 32 and the data clock provided by the counter, outputs data and a data clock, and outputs a synchronization establishment signal to a counter reset determination unit. At this time, a data value is output as output data.

A counter reset determination unit 34 receives a synchronous point signal from the maximum value detection unit 32, and outputs a reset signal to the counter 35 if the position of the synchronous point is not in the range of a predetermined position. The counter reset determination unit 34 comprises, for example, a comparator, etc. for determining whether or not the position of the synchronous point is in the range of a predetermined counter value. The counter is reset by the counter reset determination unit 34 while a preamble signal for synchronization establishment, which is received among the signals transmitted in the initial communications step is received. Therefore, the counter is reset only once while the preamble signal for synchronous establishment is being transmitted. As a result, the synchronous point gradually deviates, and finally gets out of the window. However, the synchronization can be maintained in the communications of packets having a predetermined data length.

The counter 35 generates a sampling clock in synchronism with which a data clock, a counter value, and a start-of-window signal are also generated by the counter 35.

Figure 8:
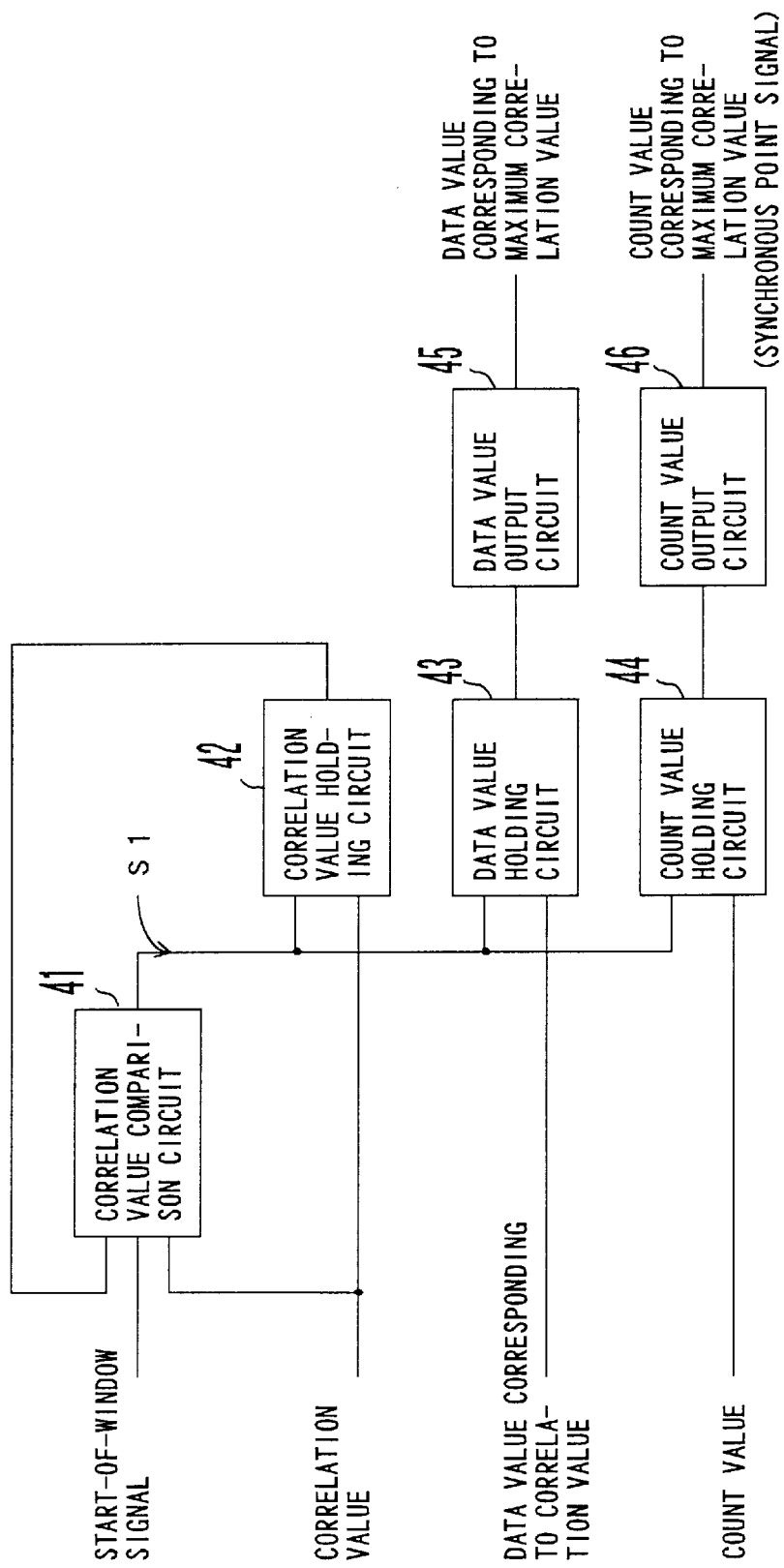
FIG. 8 is a block diagram showing the general configuration of the maximum value detection unit.

FIG. 8 is a block diagram showing the outline of the maximum value detection unit.

First, a start-of-window signal input from the counter 35 is input to a correlation value comparison circuit 41. When the correlation value comparison circuit 41 receives a start-of-window signal, it outputs a load enable signal S1 to activate a correlation value holding circuit 42, a data value holding circuit 43, and a count value holding circuit 44. The activated correlation value holding circuit 42 and data value holding circuit 43 respectively read a correlation value and a data value from the DMF 31. The count value holding circuit 44 reads a count value from the counter 35.

The correlation value held in the correlation value holding circuit 42 is input to the correlation value comparison circuit 41. The correlation value input at the subsequent timing is input to the correlation value comparison circuit 41, and compared with the correlation value held in the correlation value holding circuit 42. If the correlation value input at the subsequent timing is larger, the correlation value comparison circuit 41 outputs a load enable signal S1 to output a new correlation value, data value, and count value can be respectively input to the correlation value holding circuit 42, data value holding circuit 43, and count value holding circuit 44. The values input to the data value holding circuit 43 and count value holding circuit 44 are respectively supplied for a data value output circuit 45 and a count value output circuit 46, and held until an output enable signal is input. (The configuration is not shown in FIG. 8).

The above described operation is repeated until the next start-of-window signal is input, and a data value and a count value corresponding to the timing of the maximum correlation value in one window are held in the data value holding circuit 43 and count value holding circuit 44. At the end of a window (when the next start-of-window signal is received), an output enable signal is input to the data value output circuit 45 and count value output circuit 46 with the configuration not shown in FIG. 8. The data value output circuit 45 and count value output circuit 46 output a data value and an output value respectively held therein upon receipt of the output enable signal.

Since the data value and count value are the values corresponding to the maximum correlation values obtained in one window, the data value at a synchronous point and the count value indicating the position of the synchronous point are output. Therefore, the output count value is a synchronous point signal indicating the position of the synchronous point.

FIG. 9 is a block diagram showing a part of the synchronous point comparison unit. In FIG. 9, the configuration with which a data value is output as output data is omitted.

The synchronous point signal transmitted from the maximum value detection unit 32 is input to a synchronous point comparison circuit 47 of the synchronous point comparison unit and a synchronous point holding circuit 48 shown in FIG. 9. When the synchronous point holding circuit 48 receives a synchronous point signal at a certain time, it stores the synchronous point signal input before, provides the synchronous point comparison circuit 47 with the synchronous point signal input before to compare the signals, and transmits the result to a synchronization determination circuit 49 and an asynchronization determination circuit 50.

The signal provided for the synchronization determination circuit 49 indicates that the synchronous point has not deviated. At this time, it is determined that asychronization has not occurred, that is, the deviation has not occurred, when the synchronous point has deviated by 1 in counter value from the position detected at the previous time because of the deviation in the data clock, etc. The allowance is appropriately determined by the designer of the apparatus. This signal is also input to the synchronous point holding circuit 48 and functions as a load enable signal S1. The synchronization determination circuit 49 counts at each sampling timing the number of times the position of the synchronous point does not deviate. If the position of a synchronous point does not deviate for a specified number of times, the synchronization determination circuit 49 outputs a synchronization signal to a synchronization signal output circuit 51. The synchronization signal output circuit 51 stores the synchronization signal and outputs it to the counter reset determination unit 34.

When the synchronous point comparison circuit 47 indicates the same synchronous points are same, the load enable signal S1 is input to the synchronous point holding circuit 48, and operates the synchronous point holding circuit 48 to store the synchronous point signal newly transmitted from the maximum value detection unit 32. At this time, the synchronous point comparison circuit 47 compares the sequentially updated synchronous point signal of the synchronous point holding circuit 48 with the newly transmitted synchronous point signal, and detects that the deviation between the positions of the signals is within 1 in counter value.

If the deviation of the position of the synchronous point is detected, a signal indicating the deviation of the synchronous point is input to the asynchronization determination circuit 50.

The asynchronization determination circuit 50 counts the number of times the position of a synchronous point has deviated. When a predetermined number of times has been reached, it is recognized as asynchronization, and the synchronization signal output circuit 51 is reset to stop outputting a synchronization establishment signal. For example, the synchronization establishment signal indicates a HIGH level for synchronization and a LOW level for asynchronization. The synchronization establishment signal is input to the synchronous point holding circuit 48 as a load enable signal S2 (in this case, LOW active) to hold the synchronous point signal. That is, if the synchronous point has deviated, the synchronous point holding circuit 48 keeps holding the same synchronous point signal, and the synchronous point comparison circuit 47 compares the value of the signal with the successively transmitted synchronous point signals and transmits the result to the asynchronization determination circuit 50. If the asynchronization determination circuit 50 determines that asynchronization has occurred, a load enable signal is input from the synchronization signal output circuit 51 to the synchronous point holding circuit 48, and a synchronous point signal indicating the deviated-to position of the synchronous point is newly stored.

The synchronous point comparison circuit 47 can be, for example, a comparator, and compares the present and previous synchronous point signals stored in the synchronous point holding circuit 48. The synchronous point holding circuit 48 can be, for example, a register comprising a flipflop.

The synchronization determination circuit 49 can comprise, for example, a counter for counting the times the synchronous point is detected at the same point at each sampling, a comparator for determining whether or not the synchronous point has been detected at the same point for the predetermined times. Similarly, the asynchronization determination circuit 50 can comprise the counter and the comparator. The synchronization signal output circuit 51 can be, for example, a flipflop.

Figure 10:
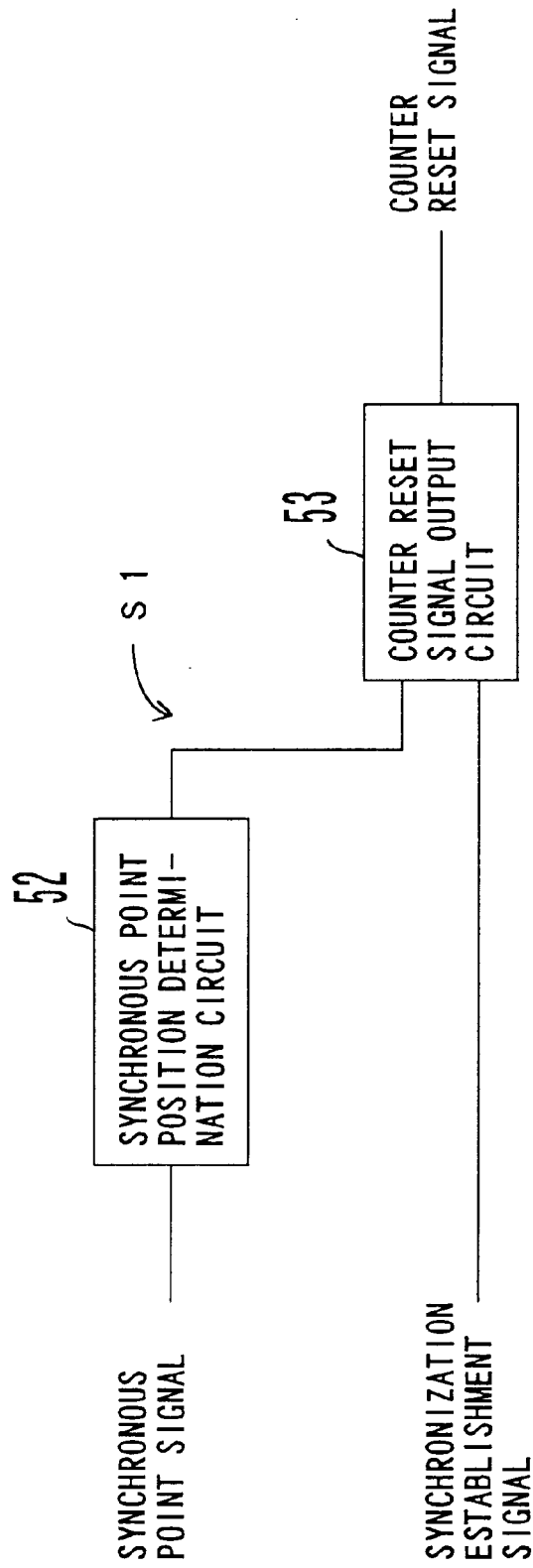
FIG. 10 is a block diagram showing the counter reset determination unit.

FIG. 10 is a block diagram showing the counter reset determination unit.

A synchronous point signal is input from the maximum value detection unit 32 to the counter reset determination unit 34. A synchronization establishment signal is input from the synchronous point comparison unit 33 to the counter reset determination unit 34. The synchronous point signal is input to a synchronous point position determination circuit 52, and it is determined whether or not the position of the synchronous point indicated by the synchronous point signal is in a predetermined range. The predetermined range refers to the area containing the central position of a window excluding the start and the end of the window. The range should be appropriately determined by the designer of the apparatus, and should be determined in a way that the position of the synchronous point can be moved to the center by resetting the counter before the synchronous point enters the adjacent window.

When the synchronous point position determination circuit 52 receives a synchronous point signal and determines that the position of the synchronous point is not in a predetermined range, it outputs an active signal S1 and inputs it to a counter reset signal output circuit 53. The counter reset signal output circuit 53 receives the synchronization establishment signal for use in determining whether or not the synchronization has been established while the synchronization establishment preamble of a received signal is transmitted. If the synchronization establishment signal has not been received and the active signal S1 from the synchronous point position determination circuit 52 sets the counter reset signal output circuit 53 active, the counter reset signal is output at a predetermined timing in a certain fime duration. Then the counter reset signal is cleared in the counter reset signal output circuit 53 after a predetermined time has passed. Therefore, the counter is reset only once while the synchronization establishment preamble of a received signal is transmitted. A predetermined timing should be appropriately set by the designer of the apparatus. For example, it is set at the center of a window, that is, the trailing timing of the data clock. In this case, although not shown in FIG. 10, the data clock is input to the counter reset signal output circuit 53 to obtain the trailing timing of the data clock.

Figure 11:
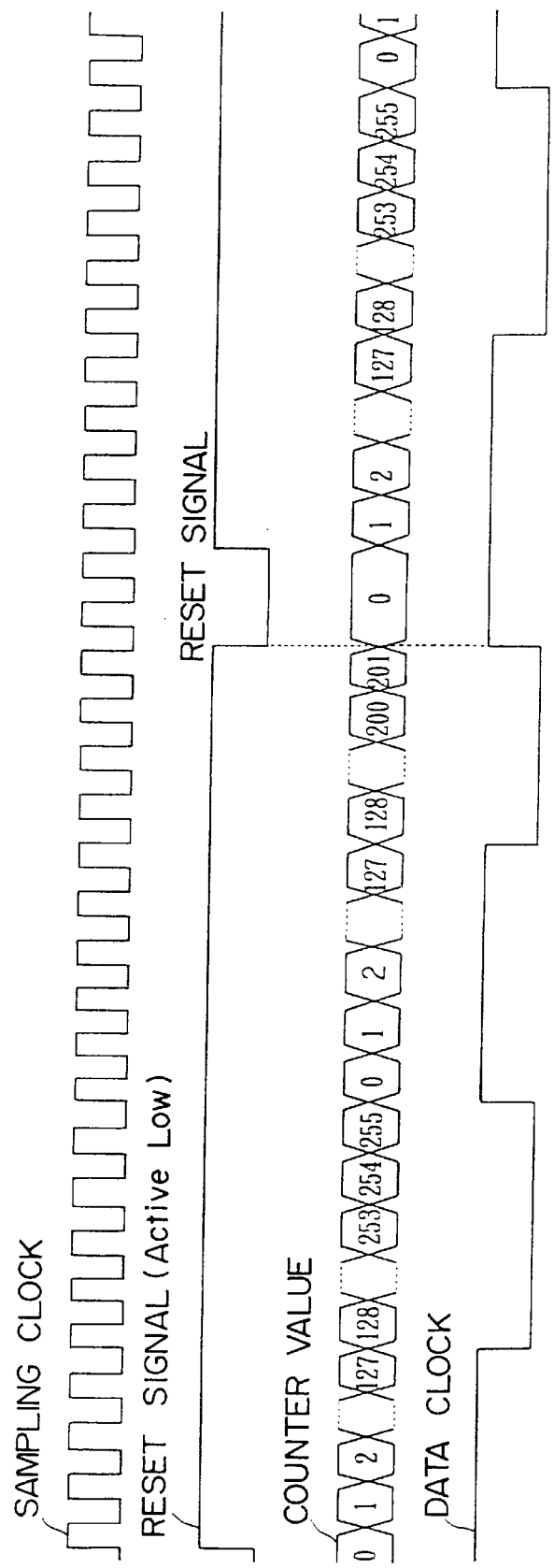
FIG. 11 is a time chart showing the correlation among the sampling clock, a reset signal, a counter value, and a data clock.

FIG. 11 is a time chart showing the mutual relationship between the sampling clock, the reset signal, the counter value, and the data clock.

The signal at the top in FIG. 11 is a sampling clock, and an oscillation signal of an oscillator provided in the receiving device. The multiplication by a PN code in the correlation unit and the computation of a correlation value are performed in synchronization with the sampling clock. If a double over-sampling is performed using a digital matched filter as described above, the sampling clock has the signal speed double as high as the chip rate of the PN code. The second signal from the top in FIG. 11 is a reset signal, and the counter is reset when the signal is in the low state. The counter values are 0 through 255. Since the count speed is obtained by a double over-sampling in the above described digital matched filter, it is double as high as the 1-bit 128-chip PN code. The signal at the bottom in FIG. 11 is a data clock and is generated based on the counter value of the counter.

First, if the counter is reset by a reset signal, the counter value starts from 0. Simultaneously, the data clock is generated in synchronization with the count value. The data clock indicates the high level when the count value is in the range from 0 to 127, and the low level when the count value is in the range from 128 to 255, thus forming one window.

FIG. 11 shows how the counter value is cyclically counted. A reset signal is input when the counter counts values on the second cycle, that is, when the counter value is 201. At this time, the sampling clock does not change its value, but the counter value newly starts counting when the reset signal is input. Since the data clock is generated corresponding to a counter value, the data clock is reset in synchronization with the count value. Thus, since the position of the window is altered, the position of the synchronous point indicating the synchronization among the correlation values obtained in synchronization with the sampling clock is relatively changed.

FIG. 12 is a block diagram showing the configuration according to the second embodiment of the demodulation circuit of the receiving device of the present invention. In FIG. 12, the component also shown in FIG. 7 is assigned the same reference number.

As shown in FIG. 7, the DMF 31 is a digital matched filter, and the correlation value and the data value are output to the maximum value detection unit 32. The maximum value detection unit 32 outputs the synchronous point signal and the data value to a synchronous point comparison unit 61, and also output the synchronous point signal to the counter reset determination unit 34.

The synchronous point comparison unit 61 constantly monitors the deviation of a synchronous point and outputs the reset signal to the counter 35 each time the synchronous point deviates. The reset signal is constantly generated when the synchronous point deviates, and the counter 35 is reset. Thus, a single synchronous point can be adjusted to be in a single window. Therefore, it can be applied to long continuous data communications. The data value transmitted from the maximum value detection unit 32 is output as output data in synchronization with the data clock provided by the counter 35.

The counter reset determination unit 34 receives inputs the synchronization establishment signal from the synchronous point comparison unit 61 and the synchronous point signal from the maximum value detection unit 32. The counter reset determination unit 34 transmits the reset signal to the counter 35 and resets the counter when the counter value indicating the position of the synchronous point is not in a predetermined range. The reset by the counter reset determination unit 34 is performed to establish the synchronization while the synchronization establishment preamble signal of the received signal transmitted at the beginning of the communications is received.

Therefore, since only the counter reset determination unit 34 resets the counter according to the first embodiment, the counter is left as is after it is first reset upon receipt of a signal. Therefore, the synchronous point gradually deviates out of the window. However, according to the second embodiment, the counter is reset with the deviation of the synchronous point detected by the synchronous point comparison unit 61. Therefore, the synchronous point is always in the window, and correct data can be regenerated for a long time. As a result, successive data as well as a packet-format data signal can be regenerated.

Figure 13:
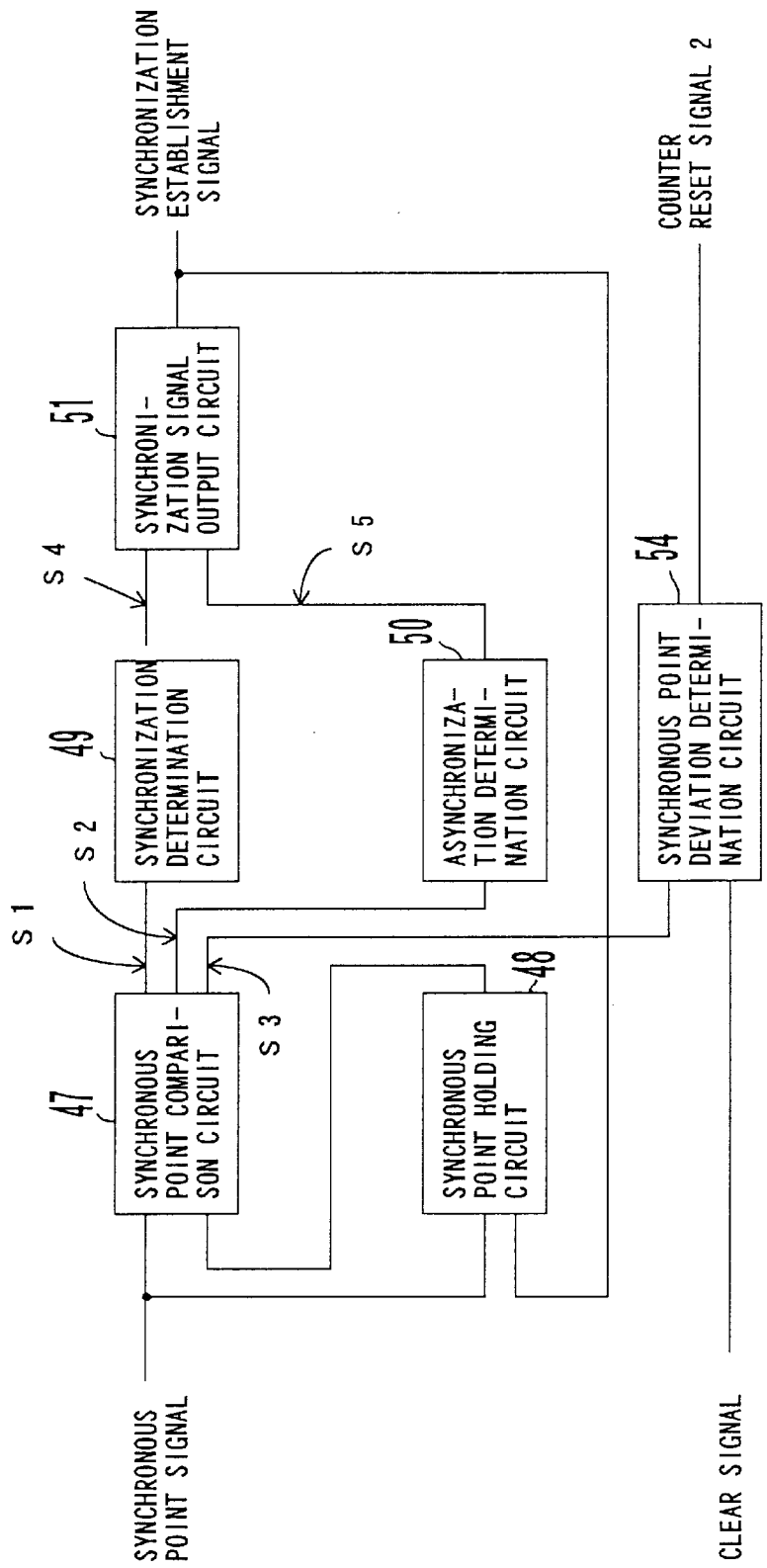
FIG. 13 is a block diagram showing the configuration of a part of the synchronous point comparison unit according to the second embodiment of the present invention.

FIG. 13 is a block diagram showing the configuration of a part of the synchronous point comparison unit according to the second embodiment. In FIG. 13, the component also shown in FIG. 9 is assigned the same reference number. In FIG. 13, as in FIG. 9, the configuration for outputting the data value and the output data is omitted.

The synchronous point signal input from the maximum value detection unit 32 is input to the synchronous point comparison circuit 47 and the synchronous point holding circuit 48. The synchronous point holding circuit 48 holds the synchronous point signal obtained when the previous data was output, and inputs the signal to the synchronous point comparison circuit 47. The synchronous point comparison circuit 47 compares the synchronous point signal at the current timing with the synchronous point signal at the previous timing, and transmits the active signal S1 to the synchronization determination circuit 49 when these signals are equal to each other. The synchronization determination circuit 49 counts the number of times the synchronous point has not deviated in the synchronous point comparison circuit 47. If the synchronous point has not deviated for a predetermined number of times, the output signal S4 is set active, and input to the synchronization signal output circuit 51. When the synchronization signal output circuit 51 receives the active signal S4 from the synchronization determination circuit 49, it outputs the synchronization establishment signal to the counter reset determination unit 34.

When the synchronous point comparison circuit 47 detects again the deviation of the position of the synchronous point, the signal S2 is set active and the asynchronization determination circuit 50 is notified of the asynchronization. When the asynchronization determination circuit 50 receives the signal S2, it counts the number of times the position of the synchronous point has deviated. If the number has reached a predetermined value, then the signal S5 to the synchronization signal output circuit 51 is set active, and the synchronization establishment signal is reset.

The reset of the synchronization establishment signal is input to the synchronous point holding circuit 48 and functions as active signal of the synchronous point holding circuit 48 to hold the synchronous point signal from the maximum value detection unit 32, and is provided for the synchronous point comparison circuit 47 to monitor the deviation of the synchronous point.

Furthermore, according to the second embodiment, when the synchronous point comparison circuit 47 detects the deviation of the synchronous point, the signal S3 is set active and input to a synchronous point deviation determination circuit 54. Depending on the direction of the deviation of the synchronous point, the signal is output to a counter reset timing determination circuit 72. When the signal S3 becomes active, the synchronous point deviation determination circuit 54 determines that the synchronous point has deviated, outputs a counter reset signal 2, and then stops the counter reset signal 2 when a clear signal is input from the counter 35.

Thus, the counter can be reset corresponding to the deviation of a synchronous point in a window by designing the configuration in which the deviation of the synchronous point is monitored and a counter reset signal can be output each time the synchronous point deviates. Therefore, the synchronous point can be constantly held in the window. As a result, correct data values can be regenerated even for successive data.

Since, according to the second embodiment, the configurations of the maximum value detection unit 32 and the counter reset determination unit 34 are the same as those according to the first embodiment, the detailed explanation about them is omitted here.

FIGS. 14A and 14B are block diagrams showing the configurations of the counter.

FIG. 14A shows the configuration of the counter according to the embodiment shown in FIG. 7. The counter is a linear counter 55. The count value and the data clock are output from the linear counter 55, and the start-of-window signal is generated through the NOR of all bit outputs of the count value. Thus, an start-of-window signal is generated at the output timing of the initial count value 0. The linear counter 55 is designed to be reset when the counter reset signal is input from the counter reset determination unit 34.

FIG. 14B shows the configuration of the counter according to the embodiment shown in FIG. 12, and comprises the linear counter 55 and a counter reset timing determination circuit 56. As in FIG. 14A, the data clock and the count value are output from the linear counter 55. The start-of-window signal is generated through the NOR of all bit outputs of the count value. The linear counter 55 is designed to be reset by the reset signal from the counter reset determination unit 34.

The counter reset timing determination circuit 56 constantly monitors the count value output from the linear counter 55, and outputs the reset signal to the linear counter 55 when a predetermined count value is obtained upon receipt of the counter reset signal 2 from a synchronous point comparison unit 61. Upon output of the reset signal, the clear signal is output to the synchronous point comparison unit 61.

The method of resetting a counter can be a method of outputting an asynchronous clear signal or a method of outputting a synchronous load signal. The latter is recommendable because of its merits of no hazard, a completely synchronous operation, etc.

According to the present invention, the receiving equipment of the spread spectrum communications system can be phase-controlled not at the sampling clock level but at the data clock level. That is, the precision of the phase control can be considerably low.

Since the synchronization of the sampling clock is not required, the hardware requirements can be considerably reduced and the circuit can be easily generated.

Using a smaller circuit, the spread spectrum communications system can be a smaller, electric-power-saving, and cost-saving system.

What is claimed is:

1. A synchronizing apparatus for use in a receiver which performs a reverse-spreading process by multiplying a signal transmitted from a transmitter by a spread code in synchronization with the signal in a spread spectrum communications system, comprising:

a counter for generating a timing signal for the multiplication by the spread code, a counter value in synchronization with the timing signal, and a data clock indicating a timing of obtaining the data value;

a maximum value detection unit for detecting a maximum correlation value output by a correlation unit for performing the reverse-spreading process, and detecting a synchronous point based on the counter value corresponding to which the maximum correlation value has been generated;

a synchronous point comparison unit for determining whether or not the counter value indicating the synchronous point obtained from said maximum value detection unit indicates a deviation of the synchronous point, and for outputting a signal indicating whether or not synchronization has been established; and a counter reset determination unit for receiving the signal indicating whether or not the synchronization has been established, transmitting a reset signal to the counter when the synchronous point has deviated, and resetting the counter.

2. The synchronizing apparatus according to claim 1, wherein said signal transmitted from the transmitter comprises a synchronization signal and a data signal;

said counter reset determination unit is reset while the synchronization signal is being transmitted; and a resetting operation is not performed when the data signal is transmitted.

3. The synchronizing apparatus according to claim 1, wherein said synchronous point comparison unit monitors the deviation of the synchronous point while the data is being transmitted from the transmitter, and resets the counter based on the deviation of the synchronous point.

4. The synchronizing apparatus according to claim 1, wherein said spread spectrum communications system is a direct sequence system.

5. A synchronizing apparatus for use in a receiver which performs a reverse-spreading process by multiplying a signal transmitted from a transmitter by a spread code in synchronization with the signal in a spread spectrum communications system, comprising:

a counter for generating a timing signal for the multiplication by the spread code, a counter value in synchronization with the timing signal, and a data clock indicating a timing of obtaining the data value;

a maximum value detection unit for detecting a maximum correlation value output by a correlation unit for performing the reverse-spreading process, and detecting a synchronous point based on the counter value corresponding to which the maximum correlation value has been generated;

a synchronous point comparison unit for determining whether or not the counter value indicating the synchronous point obtained from said maximum value detection unit is in a predetermined range, and for outputting a signal indicating whether or not synchronization has been established; and a counter reset determination unit for receiving the signal indicating whether or not the synchronization has been established, transmitting a reset signal to the counter when the synchronous point is not in the predetermined range, and resetting the counter.

6. The synchronizing apparatus according to claim 5, wherein said signal transmitted from the transmitter comprises a synchronization signal and a data signal;

said counter reset determination unit is reset while the synchronization signal is being transmitted; and a resetting operation is not performed when the data signal is transmitted.

7. The synchronizing apparatus according to claim 5, wherein said synchronous point comparison unit monitors the deviation of the synchronous point while the data is being transmitted from the transmitter, and resets the counter based on the deviation of the synchronous point.

8. The synchronizing apparatus according to claim 5, wherein
said spread spectrum communications system is a direct sequence system.

9. A method of synchronizing followed in a receiver which performs a reverse-spreading process by multiplying a signal transmitted from a transmitter by a spread code in synchronization with the signal in a spread spectrum communications system, comprising the steps of:

(a) providing a counter;

(b) generating in synchronization with an output of the counter a timing signal for the multiplication by the spread code, a counter value in synchronization with the timing signal, and a data clock indicating a timing of obtaining the data value;

(c) detecting a maximum correlation value obtained by the reverse-spreading process, and detecting a synchronous point based on the counter value corresponding to which the maximum correlation value has been generated;

(d) determining whether or not the counter value indicating the synchronous point obtained in step (c) indicates a deviation of the synchronous point, and (e) resetting the counter when the synchronous point deviates.

10. A method of synchronizing followed in a receiver which performs a reverse-spreading process by multiplying a signal transmitted from a transmitter by a spread code in synchronization with the signal in a spread spectrum communications system, comprising the steps of:

(a) providing a counter;

(b) generating in synchronization with an output of the counter a timing signal for the multiplication by the spread code, a counter value in synchronization with the timing signal, and a data clock indicating a timing of obtaining the data value;

(c) detecting a maximum correlation value obtained by the reverse-spreading process, and detecting a synchronous point based on the counter value corresponding to which the maximum correlation value has been generated;

(d) determining whether or not the counter value indicating the synchronous point obtained in step (c) is in a predetermined range, and (e) resetting the counter when the synchronous point is not in the predetermined range.

11. A synchronizing apparatus for user in a spread spectrum communications system, comprising:

means for performing a reverse-spreading process on a received signal, and obtaining a maximum correlation value on one data cycle;

means for determining whether or not a timing at which the obtained maximum correlation value is generated has deviated on one data cycle; and means for relatively adjusting the timing at which the maximum correlation value is generated on one data cycle by altering a timing of generating a data cycle when the timing at which the maximum correlation value is generated has deviated on one data cycle.

* * * * *

UNITED STATES PATENT AND TRADEMARK OFFICE
CERTIFICATE OF CORRECTION

PATENT NO. : 5,995,571 Page 1 of 1
DATED : November 30, 1999
INVENTOR(S) : Hiroyuki Inuzuka It is certified that error appears in the above-identified patent and that said Letters Patent is hereby corrected as shown below:

Column 3,
Line 24, after "133-1b," insert -- ..., --

Signed and Sealed this

Tenth Day of December, 2002

JAMES E. ROGAN
*Director of the United States Patent and Trademark Office*